(No Model.) 2 Sheets—Sheet 1.
W. H. FISHER.
TRIPOD.
No. 544,466. Patented Aug. 13, 1895.
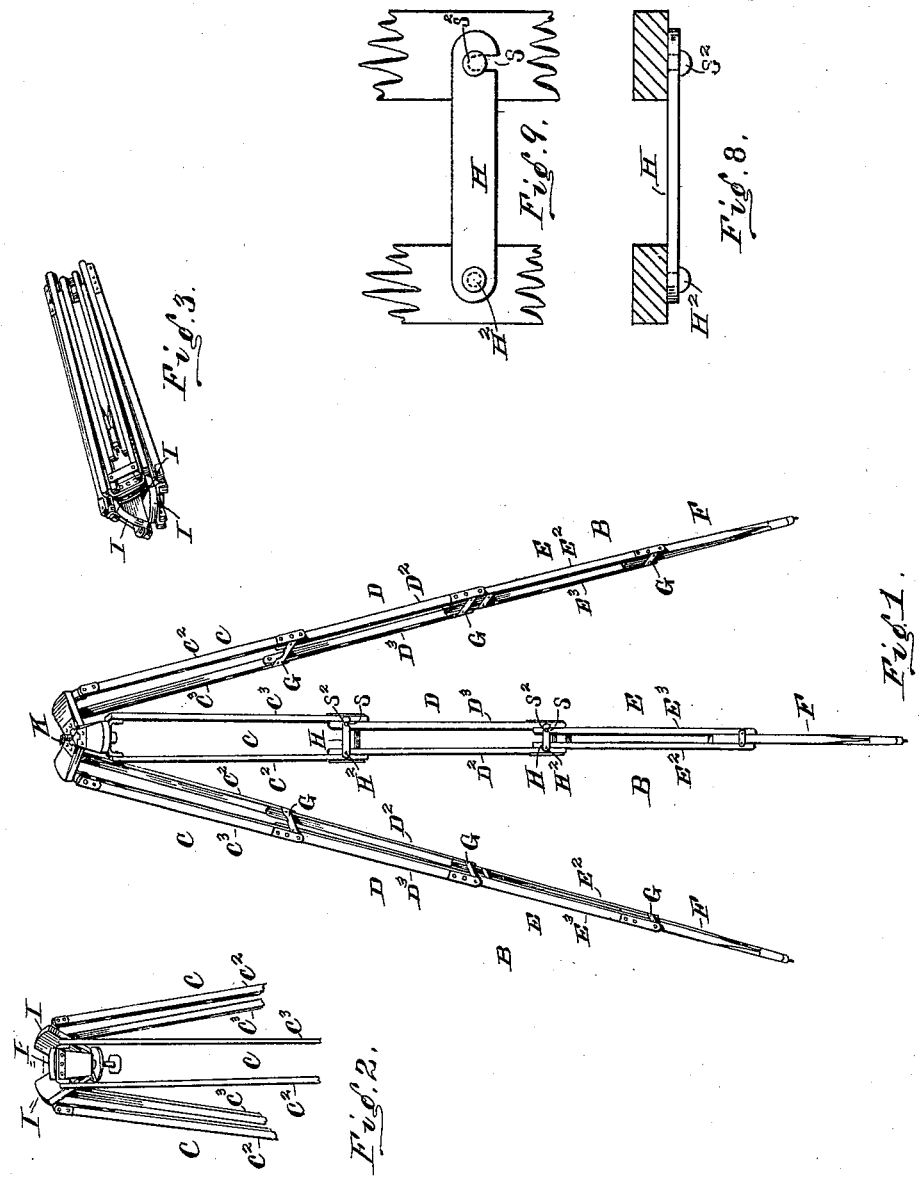
Witnesses
A. J. Ludlow
C. J. McDiarmid
Inventor
Wm. Hubbell Fisher

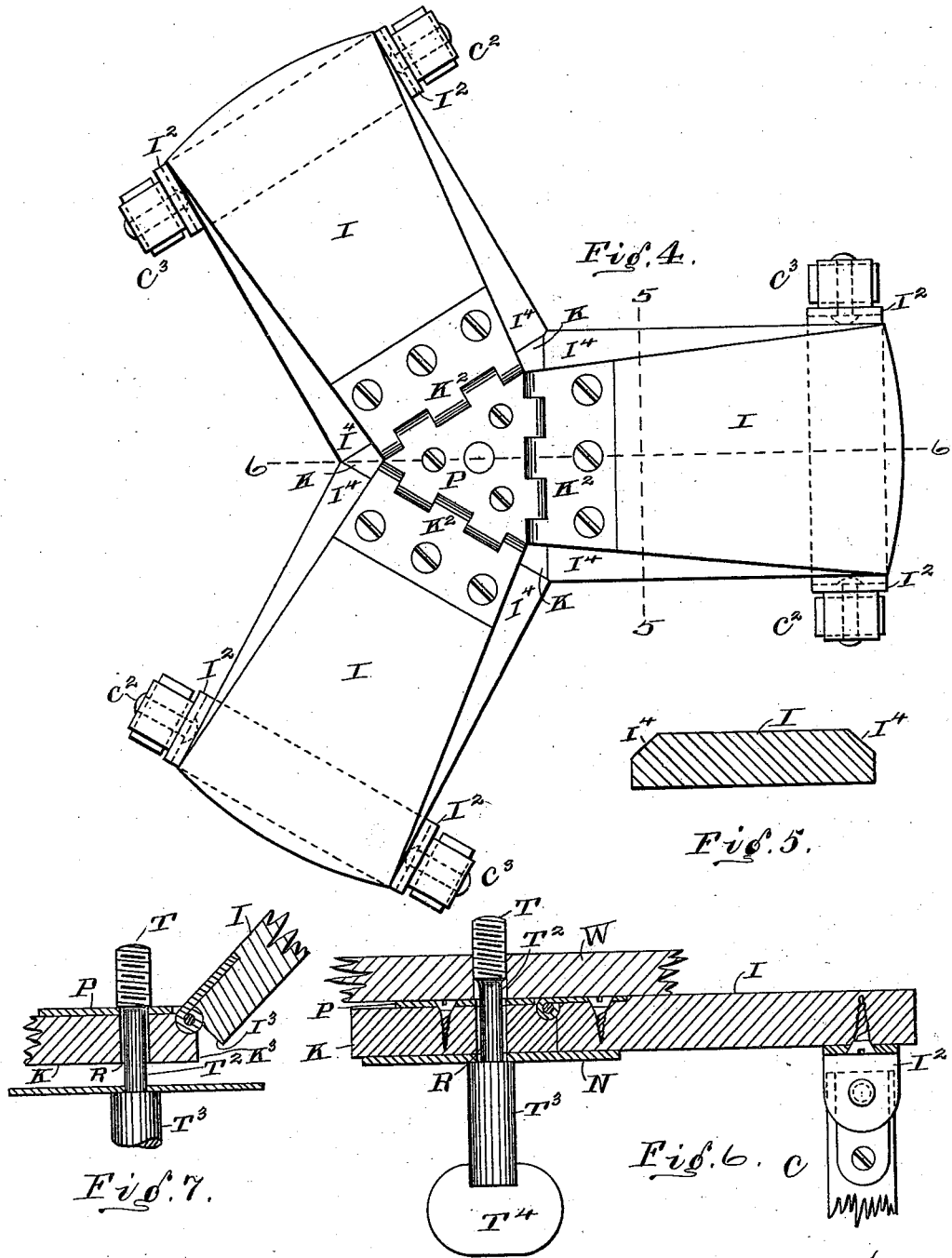

UNITED STATES PATENT OFFICE.

WILLIAM HUBBELL FISHER, OF CINCINNATI, OHIO.

TRIPOD.

SPECIFICATION forming part of Letters Patent No. 544,466, dated August 13, 1895.

Application filed May 1, 1894. Serial No. 509,639. (No model.)

*To all whom it may concern:*

Be it known that I, WILLIAM HUBBELL FISHER, a citizen of the United States, and a resident of the city of Cincinnati, in the county of Hamilton and State of Ohio, have invented certain new and useful Improvements in Tripods, of which the following is a specification.

My invention relates to the conformation and construction of the head or top portion of the tripod and the combination thereof with the legs.

The various features of my invention will be hereinafter set forth.

Among the objects of my invention I here note great compactness when packed, shut up, or folded in readiness for transportation, a constant union of the head with the legs, great facility in unfolding and applying the head of the tripod to the article to be supported, and equal facility in detaching the said head therefrom and folding it for transportation.

Other objects of the invention will be hereinafter specified.

My invention is especially designed for use in connection with photographic cameras, but can be advantageously employed for the support of other things.

In the accompanying drawings, making a part of this application, Figure 1 is a view in perspective of my tripod when unfolded and standing up for use. Fig. 2 is a top view of the tripod-head when partially unfolded or partially folded and of the upper portions of the legs where they connect with the tripod-head. Fig. 3 is a perspective view of the tripod when closed together in readiness for transportation. Figs. 4, 5, and 6 are enlarged views. Of these, Fig. 4 is a plan view of the tripod-head. Fig. 5 is a vertical section of the upper portion of the tripod taken in the plane of the dotted line 5 5 of Fig. 4. Fig. 6 represents a vertical section of a part of the upper portion of the tripod and of the base of a structure of an article secured thereto, taken in the plane of the dotted line 6 6 of Fig. 4. Fig. 7 is a section of a portion of the head, said section being taken in the plane of the dotted line 6 6 of Fig. 4, and illustrating the position of the parts when the central portion is midway depressed and the head partially folded. Fig. 8 is an edge view of latch H for locking two adjacent sections of the leg when extended. Fig. 9 is a front elevation of the parts shown in Fig. 8.

A represents in general the head of the tripod. In order to render the tripod more portable, each of its legs B B B is made in parts or sections, and these sections of a leg are connected together and are all arranged to fold the one within the next one, or all to slide the one into the other, or one or more to slide and one or more to fold into the adjacent section or member. In the present illustrative instance (see Fig. 1) each leg is composed of four sections or parts—to wit: an upper section C, composed of two parallel sticks or bars $C^2$ $C^3$, a next lower section D, composed likewise of two parallel bars $D^2$ $D^3$. The upper ends of the latter lie between the bars $C^2$ $C^3$, and are respectively pivoted thereto and may fold between the bars $C^2$ $C^3$. A next lower section E, also composed of two bars $E^2$ $E^3$, whose upper ends are respectively pivoted to the lower end portions of the bars $D^2$ $D^3$, lie between the latter and can fold between the latter. The lowest or bottom section or member F is composed of a single piece or foot length, whose upper end is located between the bars $E^2$ $E^3$, and is pivoted to the lower end portions of the said bars $E^2$ $E^3$. When these legs are extended, as shown in Fig. 1, each joint is suitably secured, so that all parts of the leg are thus kept in straight lines.

The modes and means shown in the drawings for thus securing them are as follows—to wit: Each of the sections C D E is provided with one of the back braces G. The brace G of a given section prevents the next section below, when unfolded, from unfolding beyond a plane in which the section next above is located. Each of the sections C, D, and E has at the lower end a securing-bar H. This bar H, near one end, is pivoted at $H^2$ to one of the bars of a section and is adapted to be turned or moved so as to bridge the distance between that bar and the opposite bar of the same section and there to be securely locked by receiving in a slot S of its lower edge a pin $S^2$, the head of the latter overlapping the sides of the slot.

The foregoing construction of the leg being old and well known, no further detailed description thereof will be given. The head is, in general, composed of the three divisions I and a central portion K. Each of the divisions is at its inner end K² hinged to the central portion. To this end the shape of said central portion is made triangular. There should be as many division-pieces I as there are legs, and the central piece K will have as many edges as there are division-pieces I. The three-legged stand or tripod is preferable to a four or more legged one, because the tripod will always accommodate itself to irregularities of the surface of the ground upon which it stands, and stands of more than three legs will not. I shall, therefore, describe my invention as applied to a three-leg stand. At or near their outer ends each of the division-pieces I is pivotally connected to its respective adjacent leg in any suitable manner. This pivotal connection may be made detachable. Inasmuch, however, as among the objects of my invention are—first, to furnish a head that will fold; secondly, to furnish a head that will fold up very compactly; thirdly, that will conveniently remain fast to the legs, because such arrangement serves compactness in packing and because the head cannot be mislaid, as is often the case when the head is separated therefrom; fourthly, a head that can at all times hold the legs together and prevent their misplacement; fifthly, a head that can be folded in connection with the folding legs into a compass so close that the space occupied, when thus folded is not much, if any, more than what the legs separated from the head and folded would occupy; sixthly, the head being attached to the legs saves the time and trouble and annoyance of attaching the latter to the head when the tripod is set up, and the subsequent time, trouble, and annoyance of detaching the head from the legs when the tripod is taken down or compacted—therefore, whether the pivotal connection between the legs and their respective divisions I of the head are made detachable or not, the head is preferably left attached to the legs. In the present illustrative construction each division I is pivoted to its adjacent leg by means of lugs I², extending from said division, one of these lugs passing to the side of the member C² and the other lug being at the side of the member C³. Each of the divisions I is preferably beveled—to wit: each of the two upper edges of each division are beveled, the bevel I⁴ beginning at or near the outer corner and increasing in width until it reaches the inner end of the division. This bevel enables the width of the division I to be retained all the way up to the inner or central piece K and greater strength in the division to be retained, and at the same time permits the three divisions to close up toward one another until the adjacent corners of the outer ends meet, when the head is folded, substantially as shown in figure. At the junction of a division I and the center piece K each of these preferably has a broad abutting surface or brace, respectively indicated by the characters K³ and I³, in order to brace each other and prevent deflection of the upper surfaces of the divisions below the upper plane of the said center piece when the head is screwed up against the bottom side of a camera or other thing to be supported on the tripod, especially in cases where the plate N is omitted.

These abutments I³ and K³ are each preferably slightly inclined outward and downward, so that the upper edge of each division, when the head is unfolded, is slightly higher than the plane of the center piece. Then when the head is clamped to the camera or other object, the divisions will the more firmly bind and press against the bottom of said camera, &c.

The head is secured to the base W of the camera or other article to be supported by suitable means, and, as a screw is a well known and the most common and preferred means employed for this purpose, I have shown such a screw T. The same has a narrow shank T² and a thicker shank or piece having a shoulder T³, and this lower piece terminates in a thumb-piece or handle T⁴, whereby the screw may be turned. A convenient way of holding the screw always in place is by passing the screw up through opening R and then screwing it entirely through plate P. Then it (the screw) will occupy substantially the position shown in Fig. 6, the lower edge of the screw resting on the plate and the shoulder located below the central piece.

In order to render the action of the screw more effective as a clamp, the broad disk or clamp-plate N is located between the shoulder T³ of the screw-shank and the under side of the tripod-head. This clamp-plate N is preferably made, as shown, so broad as to extend out under the division-pieces I. It is supported by the said shoulder T³. Then, when the screw is screwed into the camera, or the like, the shoulder T³ forces the clamp-plate N up against the bottom of the central piece K and the bottoms of the divisions I and aids in preventing the latter from being deflected.

In compacting the tripod the head is disconnected from the camera by turning the screw or connecting-rod. The camera being removed, the rod is pulled down upon and draws down the center piece of the head, the other portions or pieces necessarily following, until the adjacent side edges of the pieces meet. Then the head will have the appearance and take the form shown in Fig. 3. Such a form is exceedingly compact. Those fastenings of each leg which keep it rigidly extended—to wit: in the present instance the hooks—may now be disconnected from their securing-pins S² and the sections of each leg interfolded or closed together. In the illustrative instance the lower section or rod E is turned up and comes between the parts E² and E³ of the section E and remains there.

In like manner the latter section E is then turned up and passed between $D^2$ and $D^3$ of the section D, and the latter in turn is turned up and between the parts $C^2$ and $C^3$ of section C. Then the sections will all be folded together, the smallest in the center and the next largest next outside thereof and within section D, the latter in turn lying within section C. Such a tripod is very portable. A single strap or cord, elastic or otherwise, centrally applied around this compacted tripod serves to hold it in its compact form. In such form it is truly portable and can be packed in the portmanteau or gripsack or other receptacle. It can be carried under the arm. No part can get lost and every part is always in connection and ready to be unpacked for use.

The upbuilding of this tripod ready for use is the work of only a few minutes. For instance, each leg is rapidly unfolded and made rigid, as aforementioned. The tripod is then set upon its feet. The operator immediately pushes up the screw and this carries up the central plate or piece and levels the tripod-head. The camera or other thing to be supported by the tripod is set upon the head of the latter and screwed thereto by the screw. Thus the entire associated devices are quickly and conveniently adjusted.

What I claim as new and of my invention, and desire to secure by Letters Patent, is—

1. In a stand, a folding head, having a central piece provided with abutments $I^3$, and outlying pieces hinged at the upper part to said folding head, at its upper surface, and also having abutments $K^3$, on their inner ends for contact with the adjacent abutment of the central piece, the outlying pieces being disposed in a circle around the central piece, and respectively moving in planes, each lying in a radius of the circle, of which the axis of the central piece is the center, substantially as and for the purposes specified.

2. In a stand, consisting of a head or top supported, when in working position, by legs, the head adapted to fold upon itself, and a lower brace plate as N, for bracing the parts of the head when in use, and separable from the parts of the head and adjustable to and from the same, substantially as and for the purposes specified.

3. In a stand, consisting of a head or top supported, when in working position, by legs, the head constructed in sections, there being a central portion, and outlying portions hinged to the central portion, and adapted to allow the central portion when not in use to be moved out of the working plane of the head and the outer ends of the outlying portions to approach one another, and thus produce a folded head, and a brace plate as N for bracing the said sections, when the head is in use, and independent of the central piece and sections, and adjustable to and from them, substantially as and for the purposes specified.

4. In a stand consisting of a head or top supported, when in working position, by legs, the head constructed in sections, there being a central portion, and outlying portions hinged to the central portions, and adapted to allow the central portion when not in use to be moved out of the working plane of the head and the outer ends of the outlying portions to approach one another, and thus produce a folded head, and a central securing screw located in the central portion of the head, and the brace plate, located on the screw, substantially as and for the purposes specified.

5. In a stand, the head, having a central portion, and the radial pieces hinged to said central portion, and having the beveled edges $I^4$ for enabling the radial pieces I to be wide at the outer ends and yet be capable of folding together in planes at right angles to the plane of the central portion, substantially as and for the purposes specified.

6. In a stand, the combination of a central piece, a folding head having a central piece and radiating pieces, the central piece hinged to the inner ends of the radiating pieces so as to fold downward, and the outer ends of the latter hinged to the legs of the stand, so as to fold downward, the entire head when folded lying between and behind the legs, substantially as and for the purposes specified.

7. In a stand, the combination of a central piece, a folding head having a central piece and radiating pieces, the central piece hinged to the inner ends of the radiating pieces so as to fold downward, and the outer ends of the latter hinged to the legs of the stand, so as to fold downward, the entire head when folded lying between and behind the legs, the legs lying in conjunction with each other and forming, when the stand is a tripod, a triangular bundle whose edges touch and contain the folded head between them, substantially as and for the purposes specified.

8. In a tripod, the radial members I, and the central member K, hinged thereto and legs respectively hinged to the radial members, enabling the radial members with central member K to fold down between the legs, the central member containing the head, and the enlarged plate N underlying all of the joints between the central member and the radial members and extending from the central member out under the radial members, when the head is expanded for use, substantially as and for the purposes specified.

9. In a tripod, the radial members I, and the central member K, hinged thereto and legs respectively hinged to the radial members, enabling the radial members with central member K to fold down between the legs, the central member containing the head, and the enlarged plate N underlying all of the joints between the central member and the radial members and extending from the central member out under the radial members, when the head is extended for use, and the central binding screw $T^4$, having shoulder R, engaging the under side of plate N, the screw serving to bind the plate N against the head, and to draw the camera from above against the head, and to compactly hold the head between the camera and binding plate, substantially as and for the purposes specified.

10. The combination of skeleton knockdown legs, the upper section having the bars $C^2$, $C^3$, separated substantially as shown, and the folding head having the center portion, and radial pieces I hinged to said center portion, and hinged to the bars $C^2$, $C^3$, of the adjacent legs, the bars being respectively hinged to the side edges of their respective adjacent divisions or pieces I of the head, so that the outer end of said radial piece lies within the legs, substantially as and for the purposes specified.

11. The combination of skeleton knockdown legs, the upper section having the bars $C^2$, $C^3$, separated substantially as shown, and the folding head having the center portion, and radial pieces I hinged to said center portion, and hinged to the bars $C^2$, $C^3$, of the adjacent legs, the bars being respectively hinged to the side edges of their respective adjacent divisions or pieces I of the head, so that the outer end of said radial piece lies within the legs, the center K folding within the radial pieces, and the latter folding between and within the legs, substantially as and for the purposes specified.

WM. HUBBELL FISHER.

Attest:
A. S. LUDLOW,
C. J. McDIARMID.